United States Patent
Tran et al.

(10) Patent No.: US 10,318,498 B2
(45) Date of Patent: Jun. 11, 2019

(54) SYSTEM AND METHOD FOR PARALLEL SUPPORT OF MULTIDIMENSIONAL SLICES WITH A MULTIDIMENSIONAL DATABASE

(71) Applicant: ORACLE INTERNATIONAL CORPORATION, Redwood Shores, CA (US)

(72) Inventors: Long Tran, San Jose, CA (US); Vinod Padinjat Menon, San Jose, CA (US); Kumar Ramaiyer, Cupertino, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 193 days.

(21) Appl. No.: 15/332,937

(22) Filed: Oct. 24, 2016

(65) Prior Publication Data

US 2017/0116032 A1 Apr. 27, 2017

Related U.S. Application Data

(60) Provisional application No. 62/245,877, filed on Oct. 23, 2015, provisional application No. 62/411,473, filed on Oct. 21, 2016.

(51) Int. Cl.

| G06F 9/46 | (2006.01) |
|---|---|
| G06F 16/21 | (2019.01) |
| G06F 17/30 | (2006.01) |
| G06F 16/28 | (2019.01) |
| G06F 9/50 | (2006.01) |

(52) U.S. Cl.
CPC .......... *G06F 16/211* (2019.01); *G06F 9/5061* (2013.01); *G06F 16/283* (2019.01); *G06F 17/30292* (2013.01); *G06F 17/30592* (2013.01)

(58) Field of Classification Search
None
See application file for complete search history.

(56) References Cited

U.S. PATENT DOCUMENTS

| 6,574,720 B1* | 6/2003 | Hopeman | G06F 12/084 707/999.202 |
|---|---|---|---|
| 2006/0010159 A1* | 1/2006 | Mirchandani | G06F 17/30592 |
| 2006/0020921 A1* | 1/2006 | Pasumansky | G06F 11/3636 717/124 |
| 2007/0094668 A1* | 4/2007 | Jacquot | G06F 9/50 718/104 |
| 2008/0172636 A1* | 7/2008 | Danas | G06F 17/30398 715/835 |

* cited by examiner

*Primary Examiner* — Kenneth Tang
(74) *Attorney, Agent, or Firm* — Tucker Ellis LLP

(57) ABSTRACT

A system and method is described for use with a multidimensional database computing environment to provide support for parallel calculation of multidimensional slices. Users are able to specify a set of slices and a number of parallel threads to employ. The multidimensional database environment generates tasks that include calculations and/or aggregations, which are able to be executed by the system in parallel. Also described herein are mechanisms of utilizing variables within the calculations performed by respective threads, and combining thread variables after execution.

20 Claims, 6 Drawing Sheets

SYSTEM AND METHOD FOR PARALLEL SUPPORT OF MULTIDIMENSIONAL SLICES WITH A MULTIDIMENSIONAL DATABASE

CLAIM OF PRIORITY

This application claims the benefit of priority to U.S. Provisional Application titled "SYSTEM AND METHOD FOR PARALLEL SUPPORT OF MULTIDIMENSIONAL SLICES WITH A MULTIDIMENSIONAL DATABASE", Application No. 62/245,877, filed Oct. 23, 2015; and U.S. Provisional Application titled "SYSTEM AND METHOD FOR PROVIDING A MULTIDIMENSIONAL DATABASE", Application No. 62/411,473, filed Oct. 21, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to online analytical processing and multidimensional database computing environments, and to systems and methods for providing support for parallel calculation of multidimensional slices.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, a system and method is described for use with a multidimensional database computing environment to provide support for parallel calculation of multidimensional slices. Users are able to specify a set of slices and a number of parallel threads to employ. The multidimensional database (e.g., Essbase) environment generates tasks that calculations and/or aggregations, which are able to be executed in parallel. Also described herein are mechanisms of utilizing variables within the calculations performed by respective threads and combining thread variables after execution.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
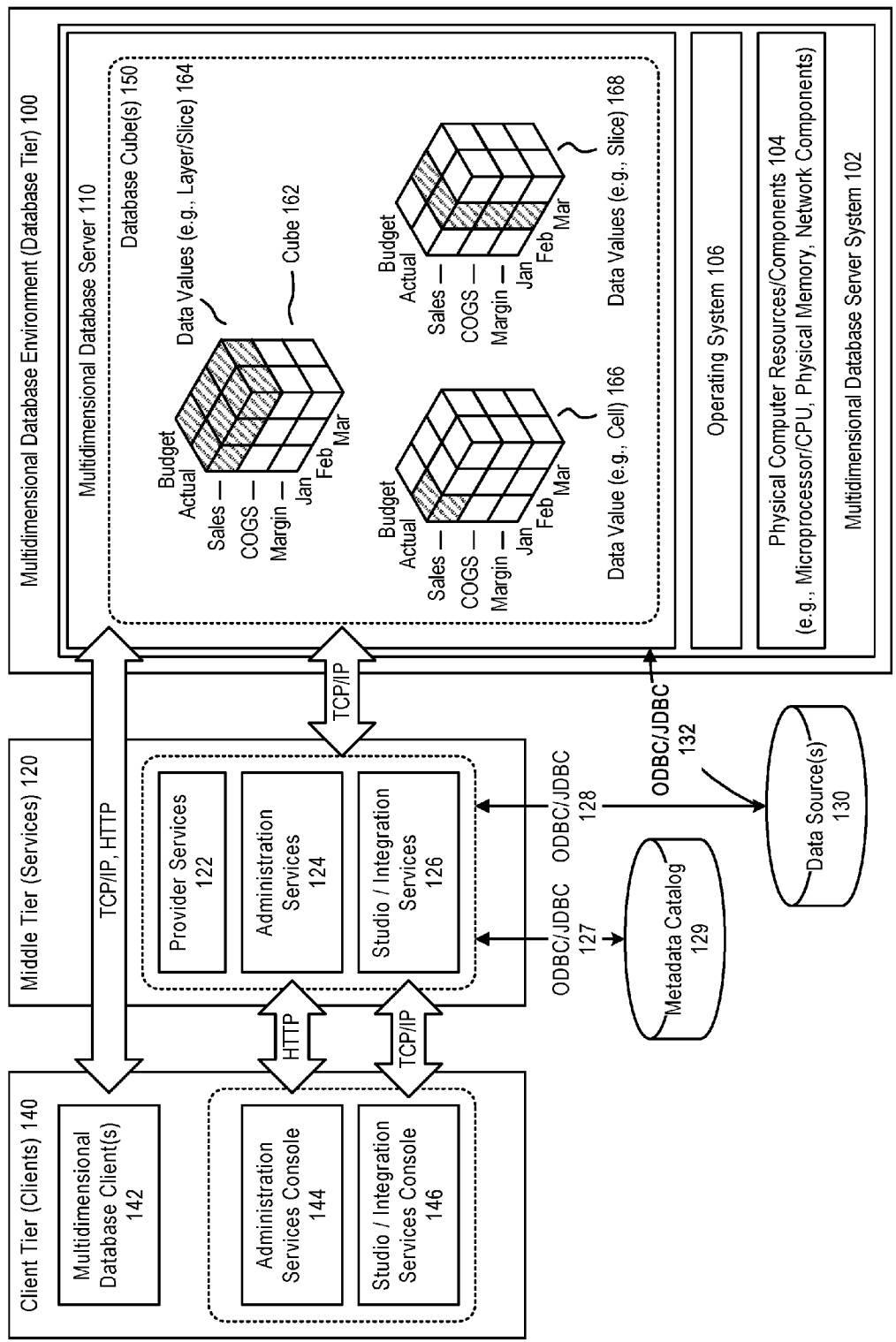
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-In

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Parallel Calculation Support for Multidimensional Slices

In accordance with an embodiment, a system and method is described for use with a multidimensional database computing environment to provide support for parallel calculation of multidimensional slices. Users are able to specify a set of slices and a number of parallel threads to employ. The multidimensional database (e.g., Essbase) environment generates tasks that calculations and/or aggregations, which are able to be executed in parallel. Also described herein are mechanisms of utilizing variables within the calculations performed by respective threads and combining thread variables after execution.

Parallel Calculation

In accordance with an embodiment, a multidimensional database system provides two ways of invoking a calculation: either the calculation may be implicitly specified by an outline itself; or the calculation may be explicitly specified by a calculation script that an administrator or other user creates, wherein the script contains formulas and calculation instructions. Regardless of how a calculation is triggered, the system can execute the calculation in one of two modes:

Serial calculation is the default. With serial calculation, each calculation pass is scheduled to run on a single processor or thread. If invoked from a calculation script, the calculations are executed sequentially in the order in which they appear in the calculation script.

Parallel calculation breaks each calculation pass into sub-tasks. The sub-tasks that can run independently of one another are scheduled to run simultaneously on a plurality of threads (e.g. 64 threads, 128 threads, or more or less depending on the capabilities of the computer system).

Parallel calculation is typically unavailable when a calculation script contains temporary variables (i.e., VAR variables). For some calculations, parallelism can be preferable even in circumstances where temporary variables are utilized. For instance, a calculation script that performs an operation on a portion of a multidimensional database defined by a member list can be constructed so that every unique combination of sparse members of the member list can be calculated independently. When a plurality of threads are available for calculations, the calculation script executes more efficiently when the slice (defined by the member list) is further divided into smaller slices (defined by the unique combinations sparse members), which are executed simultaneously by the plurality of threads.

Thus, according to an embodiment, a user-controllable parallel calculation feature is introduced to enhance a calculation engine in a multidimensional database environment. A command block structure is available to users, that instructs the calculation engine to execute a block of commands, which may use variables, using a set of threads on a set of specified independent slices. Accordingly, parallel calculation support is restored for calculation scripts utilizing variables.

FIXPARALLEL

According to an example, user-defined parallelism is enabled by a FIXPARALLEL block in a calculation script. The FIXPARALLEL block specifies a member list (e.g. slices), a number of parallel threads to employ, and commands or operations to be performed on the slices. The multidimensional database environment generates a plurality of tasks that respectively operate on smaller partitions of a database segment specified by the member list. Each task includes the commands or operations from the FIXPARALLEL block and is executed by a respective thread in parallel with other tasks. The syntax for this structure is:

```
FIXPARALLEL (n, fixMbrs)
COMMANDS;
ENDFIXPARALLEL
```

Where fixMbrs is a member name or list of members from any database dimension and n specifies a number of threads to be utilized to simultaneously execute tasks.

The command or operations of the FIXPARALLEL block may utilize variables. To support parallelism, each thread executing tasks generated from FIXPARALLEL block may employ one or more thread variables. The FIXPARALLEL block may include a POSTFIXPARALLEL statement to instruct the multidimensional database environment to aggregate or otherwise correlate values of respective thread variables following execution of all tasks. For example, the following syntax can be used:

[POSTFIXPARALLEL
 ([varName=ACCUMULATEVAR
 (threadVarName);]*);]

Where varName is a VAR variable, threadVarName is a thread variable, and ACCUMULATEVAR is a function to copy thread variables to the VAR variable. Thus, work performed in parallel can be brought together to produce a similar result as if the work was performed serially with conventional techniques.

FIGS. 2-6 illustrate a parallel calculation in a multidimensional database environment according to an embodiment.

Figure 2:
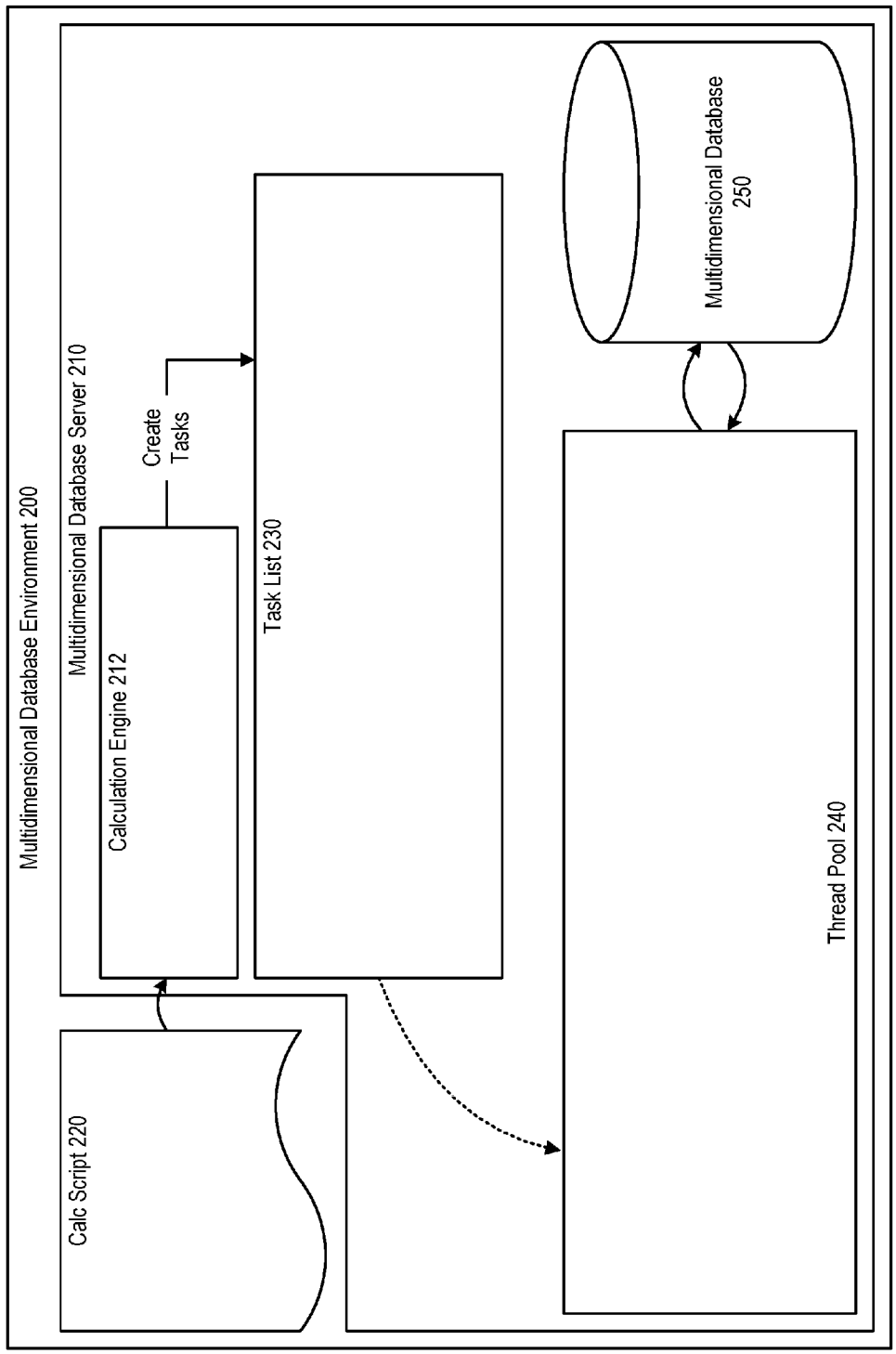
FIG. 2 illustrates a parallel calculation within a multidimensional database environment in accordance with an embodiment.

As illustrated in FIG. 2, a multidimensional database environment (e.g., Essbase) 200 can include or provide a database server 210 that manages user requests and administers a multidimensional database 250. While multidimensional database 250 is depicted as a part of database server 210, it is to be appreciated that multidimensional database 250 can be distributively stored by a plurality of servers, maintained on a separate server communicatively coupled to database server 210 via a network or as part of a cluster, or otherwise accessible to database server 210 for administration, data retrieval, data storage, or data calculation.

The database server 210 provides a calculation engine 212 to carry out calculations or other operations requested by users. For instance, a user can supply a calculation script 220 to calculation engine 212. The calculation script 220 can include various commands and/or operations to be performed on multidimensional database 250. Based on the calculation script 220, the calculation engine 212 can generate a plurality of tasks to fulfill a desired operation and add the tasks to a task list or queue 230. In an example, the plurality of tasks included in the task list 230 can be sub-tasks of a larger operation specified in the calculation script 220.

According to an aspect, task list 230 includes independent tasks capable of being carried out simultaneously or in parallel. To support parallel execution, a main thread (utilized by the calculation engine 212 to process the calculation script 220 and generate task list 230) can create one or more child threads to be a used as a thread pool 240 to execute tasks of tasks list 230. After execution of all tasks by thread pool 240, the main thread of calculation engine 212 can resume and proceed to additional operations in calculation 220, if any.

According to an embodiment, the main thread (i.e., a primary calculation thread or a thread executing the calculation engine 212) creates, initializes, and destroys child threads. The main thread also manages and/or provides access to the task list 230. The child threads of thread pool 240 can search for available tasks from task list 230, execute tasks, and notify the main thread when no more tasks are available.

Figure 3:
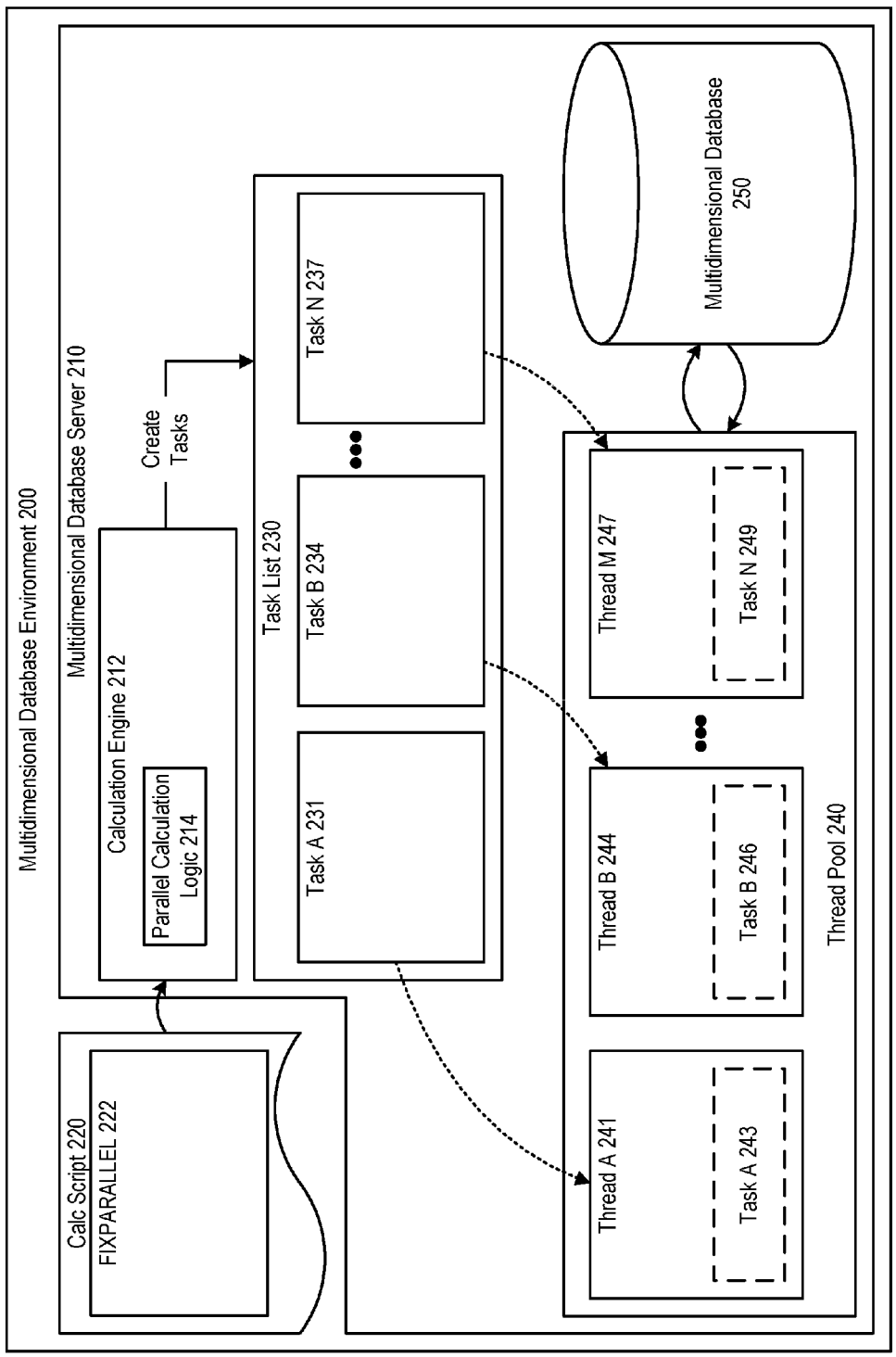
FIG. 3 further illustrates a parallel calculation within a multidimensional database environment in accordance with an embodiment.

Turning to FIG. 3, in accordance with an embodiment, the calculation script 220 can include a FIXPARALLEL block 222, which enables a user-defined parallel calculation. When the calculation engine 212 encounters the FIXPARALLEL block 222 during execution of the script 220, the calculation engine 212 invokes parallel calculation logic 214 to generate task list 230. For example, as shown in FIG. 2, the calculation engine 212 generates a plurality of tasks including task A 231, task B 234, . . . task N 237, where N is any integer.

In an embodiment, each task of task list 230 can be a FIX command block. A FIX command block restricts database calculations to a subset of the database. That is, any commands included in the FIX command block are applied to the specified database subset. The syntax for a FIX command block is:

```
FIX (fixMbrs)
COMMANDS ;
ENDFIX
```

Where fixMbrs is a member name or list of members from any number of database dimensions and COMMANDS are a set of commands or operations to be performed on the subset of the database defined by fixMbrs. The parameter fixMbrs can include member set functions, which build member lists based on other members, as well as AND/OR operators.

The FIX command block defines a fixed range of dimensions or members to which the associated commands are restricted. The FIX command block enables separate portions of the database to be calculated with different formulas, if desired. Further, FIX command blocks can be nested within other FIX command blocks. As shown above, the ENDFIX keyword terminates a FIX command block.

Following task creation, tasks of task list 230 are distributed among threads of thread pool 240 for execution. Thread pool 240 can include any number of child threads created by the calculation engine 212. As depicted in FIG. 2, thread pool 240 includes thread A 241, thread B 244, and thread M 247, where M is a positive integer.

For instance, Thread A 241 can execute Task A 243, Thread B executes Task B 246, and Thread M can execute Task N 249.

The task assignments depicted in FIG. 2 are exemplary illustrations and task execution is not to be limited to a one-to-one mapping between threads and tasks. For example, N can be larger than M such that there exist more tasks to be executed than threads created to perform calculations. In such circumstances, parallel execution of all task simultaneously is unavailable.

In accordance with an embodiment, the calculation engine 212 (particularly, the main thread of the calculation) can utilize task list 230 as a queue to distribute tasks to thread pool 240.

In one example, tasks of task list 230 can be queued according to an order of members as provided with the FIXPARALLEL block 222.

According to another example, the tasks can be queued according to database outline order. Once an order is established for task list 230, threads of thread pool 240 will respectively remove a task from the front of the queue (or be assigned a task by the main thread), execute the task, and perform a next available task from task list 230, if any. In a further example, the calculation engine 212 can partition task list 230 into a set of queues, and respectively associate each queue with a thread of thread pool 240.

Figure 4:
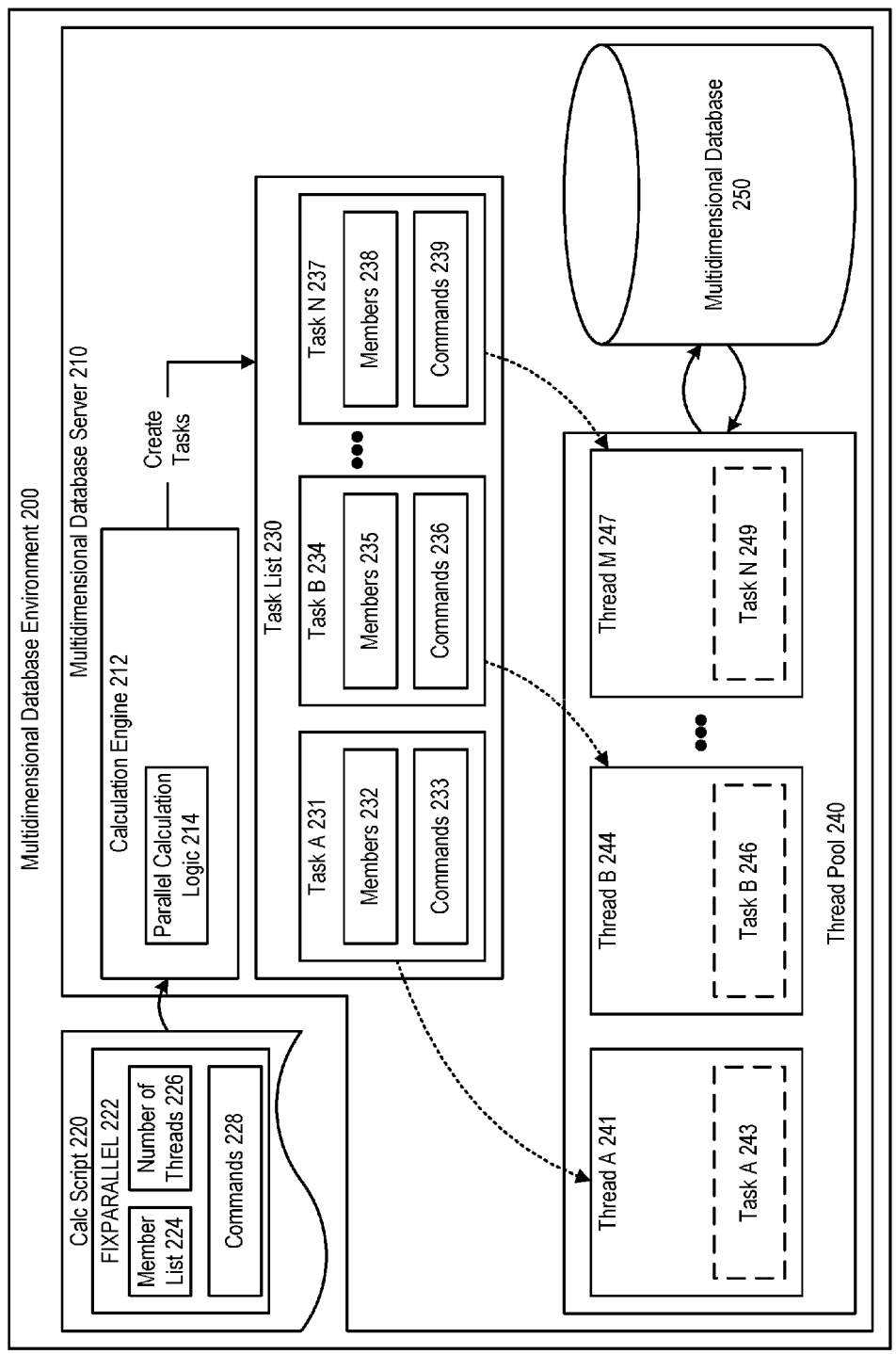
FIG. 4 further illustrates a parallel calculation within a multidimensional database environment in accordance with an embodiment.

FIG. 4, in accordance with an embodiment, a FIXPARALLEL block 222 specifies a member list 224, a number of threads 226, and commands 228. The number of threads 226 indicates how many child threads will be employed to calculate tasks generated for the FIXPARALLEL block 222. According to the example depicted in FIG. 4, the number of threads 226 can specify M threads.

As described above, the calculation engine 212 creates task list 230 having a plurality of tasks based on the FIXPARALLEL block 222. Each task can be a generated FIX command block specifying a subset of members and commands to perform. For instance, task list 230 can include task A 231, task B 234, . . . task N 237, where N is any integer. Each task, in turn, is respectively associated with members 232, 235 and 238, and includes commands 233, 236 and 239. Commands 233, 236 and 239 correspond to commands 228 of the FIXPARALLEL block 222.

In an embodiment, tasks of task list 230 are created based on non-dynamic sparse members of member list 224. For example, each task of task list 230 corresponds to one combination of non-dynamic sparse members from member list 224. More specifically, each task fixes on one sparse member, from member list 224, for each sparse dimension represented by member list 224.

As illustrated in FIG. 4, members 232 (Task A 231) represents one combination of non-dynamic sparse members from member list 224, members 235 (Task B 234) represents another combination of non-dynamic sparse member from member list 224, and members 238 (Task N 237) represents yet another combination of non-dynamic sparse members. For each task (Task A 231, Task B 234, . . . Task N 237), the respective commands (e.g., commands 233, 236, 239) are performed on respective regions of multidimensional database 250 delineated by respective combinations of sparse members (e.g., members 232, 235, 238).

As described above, FIXPARALLEL block 222 can utilize variables in a multi-threaded calculation environment. The calculation script 220 can include at least two types of variables. One type include variables used outside of the FIXPARALLEL block 222 and have a scope corresponding to the calculation script 220. A second type includes temporary variables utilized within the FIXPARALLEL block 222.

Figure 5:
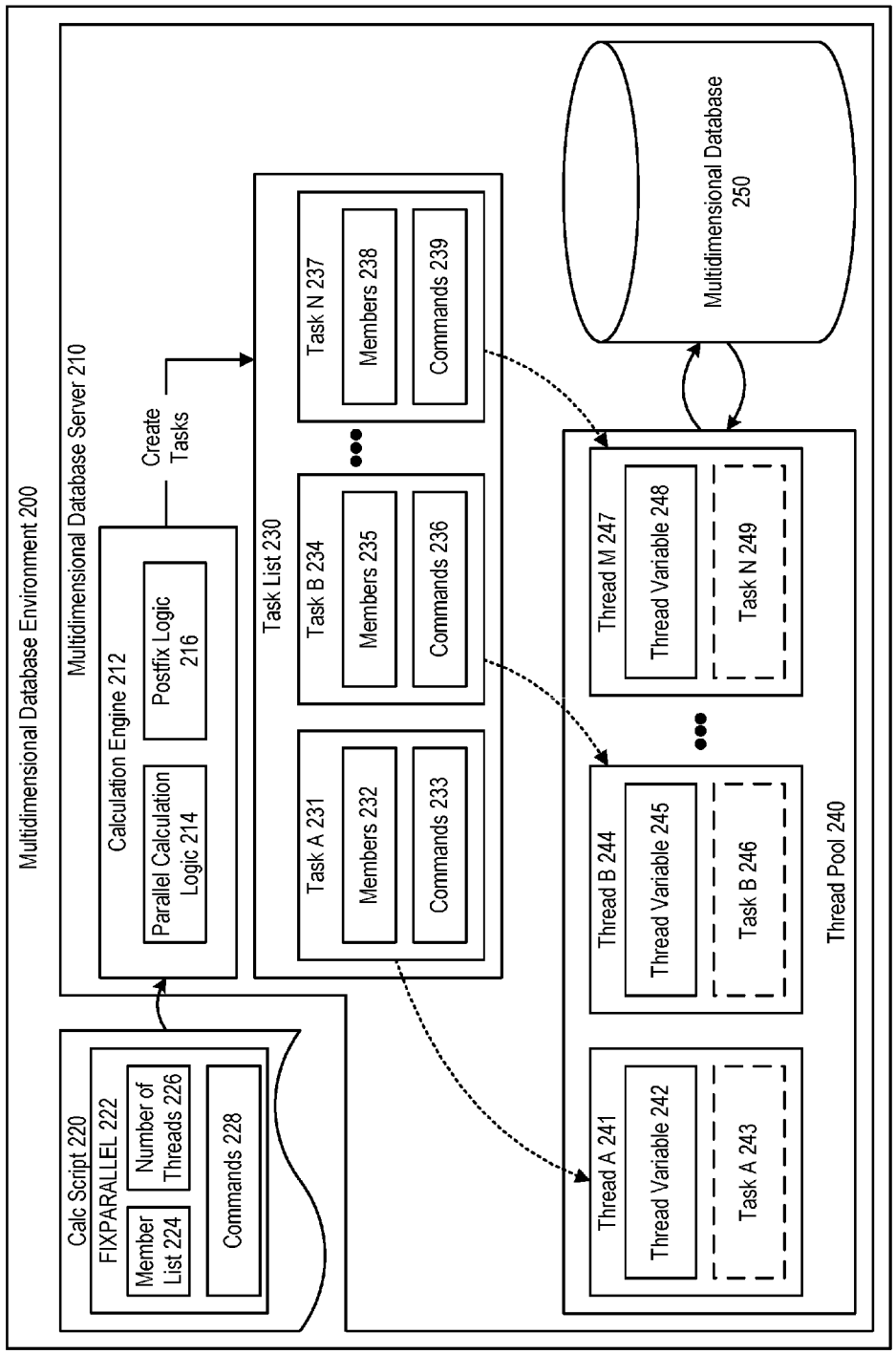
FIG. 5 further illustrates a parallel calculation within a multidimensional database environment in accordance with an embodiment.

Turning to FIG. 5, in accordance with an embodiment, the multidimensional database environment 200 creates thread variables to execute commands 228 that employ temporary variables.

For each child thread 241, 244, . . . 247 of thread pool 240, the calculation engine 212 can create respective thread variables 242, 245, . . . 248 for each temporary variable declared in commands 228. The thread variables 242, 245, . . . 248 have a thread scope such that the thread variables can be accessed and/or modified by any task executed by respective threads 241, 244, . . . 247.

Each thread of thread pool 240 can include more than one thread variable and utilizes different thread variables for different purposes. For instance, a first thread variable is utilized to hold a result of a calculation for a particular task executed by a thread. A second thread variable can be employed to accumulate calculation results for all tasks executed by the thread. In other words, one thread variable is a task variable for a current calculation being executed and the other thread variable is an accumulation of all calculations performed by a particular thread.

Upon completion of all tasks from task list 230, postfix logic 216 of the calculation engine 212 can be executed to copy values from thread variables to other variables. For example, the thread variables can be copied to variables having a larger scope such as a scope at a calculation script level. In another example, the thread variables 242, 245, . . . 248 can be accumulated and copied to a variable declared outside the FIXPARALLEL block 222. Thus, the computation result from calculations performed in parallel according to the FIXPARALLEL block 222 are available to later portions of calculation script 220.

Figure 6:
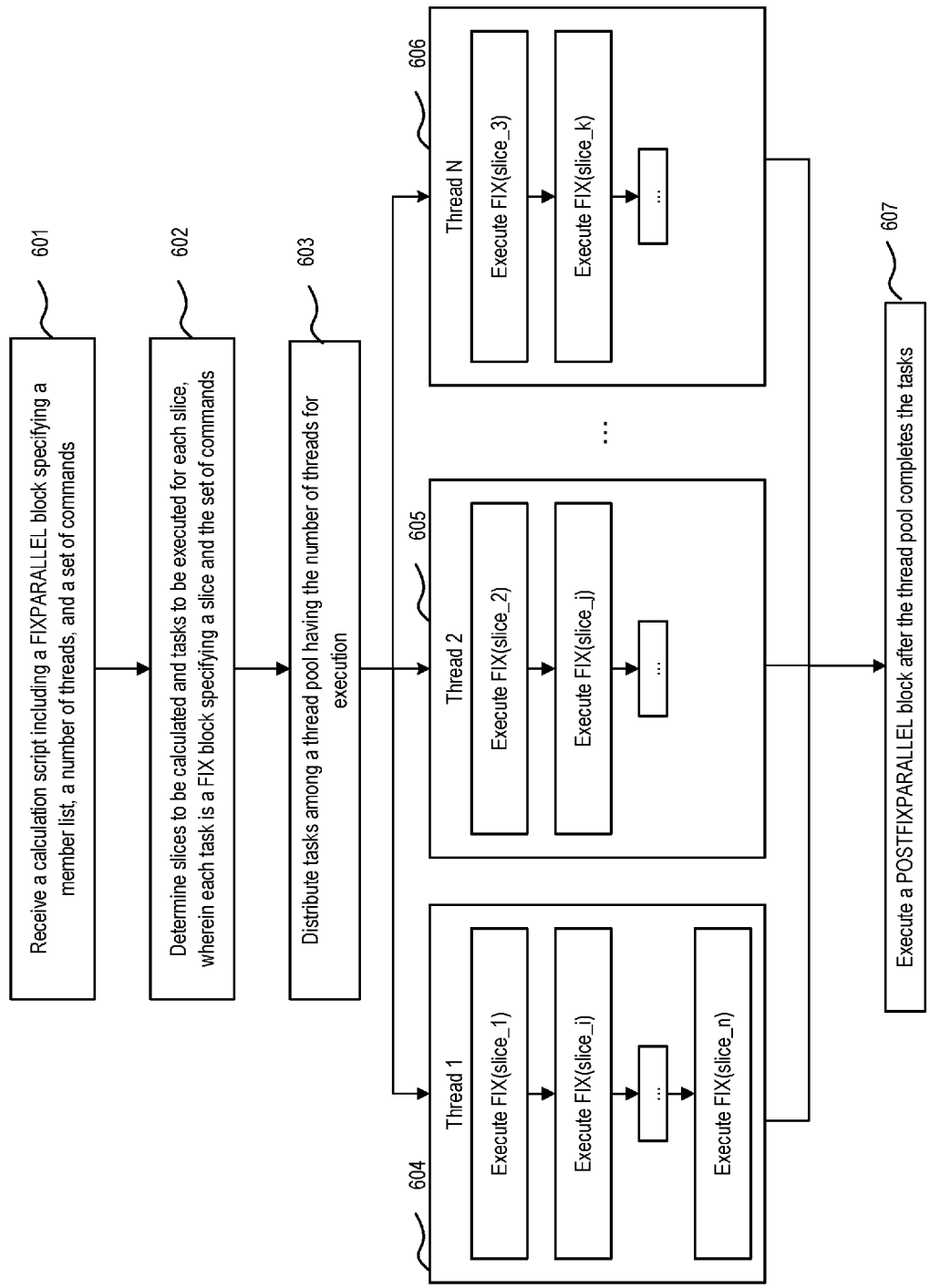
FIG. 6 illustrates a flow chart describing a parallel calculation within a multidimensional database environment in accordance with an embodiment.

FIG. 6 illustrates a flowchart describing a parallel calculation within a multidimensional database environment in accordance with an embodiment. As illustrated in FIG. 6, at step 601, a calculation script is received. The calculation script can include a FIXPARALLEL block that specifies a member list, a number of threads to be utilized for calculations, and a set of commands to be performed.

At step 602, based on the FIXPARALLEL block in the calculation script, a calculation engine of the multidimensional database can determine slices to be calculated and tasks to be executed for each slice. The slices are determined by the member list specified by the FIXPARALLEL block. For instance, each slice determined can be a unique combination of sparse members from the member list. According to an example, the tasks corresponding to each slice can be a FIX command block that specifies the respective slice and includes the set of commands also included in the FIXPARALLEL block.

At step 603, created tasks are added to a task list for distribution among threads of a thread pool for execution. According to an aspect, the thread pool includes a number of threads corresponding to the number of thread specified in the FIXPARALLEL block.

At steps 604, 605, and 606, respective execution flows are shown for thread 1, thread 2, . . . up to thread N, where N is any integer. As shown, thread 1 can start with executing a task for slice_1, thread 2 executes a task for slice_2, and thread N executes a task on slice_3. Upon respective completion of a first task (which may complete at different times), thread 1 move on to executing slice_i, thread 2 executes slice_j, and thread N begins execution of slice_k, where i, j, and k are any integers. This execution flow continues for each thread until a final task (e.g., on slice_n) is executed.

At step 607, after completion of all tasks by all threads collectively, the calculation engine can execute a POSTFIX-PARALLEL block. At this step, any thread variables utilized to accumulate respective computations by each thread are accumulated again to a final result so as to be available to a user or for other calculations after the FIXPARALLEL block.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of an Oracle Essbase multidimensional database environment, in accordance with various embodiments the components, features, and methods described herein can be used with other types of online analytical processing or multidimensional database computing environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing parallel calculation within a multidimensional database environment, comprising:
a multidimensional database for storing data associated with a plurality of dimensions, each dimension having a plurality of members; and
a computing device having a processor executing instructions that configures the processor to:
receive a calculation script specifying at least a member list and a command to be performed on a portion of the multidimensional database indicated by the member list;
determine two or more slices to be calculated based upon at least the member list, wherein each of the two or more slices comprises a unique combination of members from the member list;
generate a task list based on the member list and the determined two or more slices that contains a plurality of tasks that are simultaneously executable, wherein each task includes the command and is associated with a respective slice of the two or more slices; and
execute each task of the task list by using a set of threads.

2. The system of claim 1, wherein the calculation script further specifies a number of threads, of the set of threads, to be utilized to execute tasks of the task list.

3. The system of claim 1, wherein the command of the calculation script includes at least one variable.

4. The system of claim 3, wherein each thread of the set of threads utilizes a respective thread variable when executing the command that include the at least one variable.

5. The system of claim 4, wherein the processor further executes instructions to configure the processor to combine respective thread variables from respective threads of the set of thread following completion of all tasks of the task list.

6. The system of claim 1, wherein the member list is a user-definable parameter of the calculation to direct a parallel calculation to a database region.

7. The system of claim 1, wherein the member list includes at least one non-dynamic sparse member.

8. The system of claim 7, wherein the task list is generated based on the at least one non-dynamic sparse member included in the member list.

9. A method for parallel calculation for a multidimensional database, comprising:
receiving, at a computing device, a calculation that specifies at least a member list and a command to be performed on a portion of the multidimensional database indicated by the member list;
determine two or more slices to be calculated based upon at least the member list, wherein each of the two or more slices comprises a unique combination of members from the member list
generating, by the computing device, a task list based on the member list and the determined two or more slices, wherein the task list contains a plurality of tasks that are simultaneously executable, each task includes the command and is associated with a respective slice of the two or more slices; and
executing each task of the task list by a set of threads provided by the computing device.

10. The method of claim 9, wherein the calculation script further specifies a number of threads, of the set of threads, utilized to execute tasks of the task list.

11. The method of claim 9, wherein the command of the calculation script includes at least one variable.

12. The method of claim 11, further comprising utilizing, by each thread of the set of threads, a respective thread variable when executing the command that includes the at least one variable.

13. The method of claim 12, further comprising combining respective thread variables from respective threads of the set of thread following completion of all tasks of the task list.

14. The method of claim 9, wherein the member list includes at least one non-dynamic sparse member, and the method further comprises generating the task list based on the at least one non-dynamic sparse member included in the member list.

15. A non-transitory computer-readable storage medium having instructions stored thereon, which when read and executed by a computer, cause the computer to:
parse a calculation script specifying at least a member list and a command to be performed on a portion of the multidimensional database indicated by the member list;
determine two or more slices to be calculated based upon at least the member list, wherein each of the two or more slices comprises a unique combination of members from the member list;
generate a task list based on the member list and the determined two or more slices that contains a plurality of tasks that are simultaneously executable, wherein each task includes the command and is associated with a respective slice of the two or more slices; and
execute each task of the task list by using a set of threads.

16. The non-transitory computer-readable medium of claim 15, wherein the calculation script further specifies a number of threads, of the set of threads, to be utilized to execute tasks of the task list.

17. The non-transitory computer-readable medium of claim 16, wherein the command of the calculation script includes at least one variable.

18. The non-transitory computer-readable medium of claim 17, wherein each thread of the set of threads utilizes a respective thread variable when executing the command that include the at least one variable.

19. The non-transitory computer-readable medium of claim 18, wherein the instructions further cause the computer to aggregate respective thread variables associated with respective threads of the set of thread following completion of all tasks of the task list.

20. The non-transitory computer readable storage medium of claim 15, wherein the member list includes at least one non-dynamic sparse member, and the method further comprises generating the task list based on the at least one non-dynamic sparse member included in the member list.

* * * * *